United States Patent [19]

Beckmann

[11] 4,376,667
[45] Mar. 15, 1983

[54] METHOD OF INCREASING THE WEAR RESISTANCE OF AN ELASTOMERIC BODY

[75] Inventor: Otto Beckmann, Traiskirchen, Austria

[73] Assignee: Semperit Aktiengellschaft, Vienna, Austria

[21] Appl. No.: 926,222

[22] Filed: Jul. 19, 1978

[30] Foreign Application Priority Data

Aug. 4, 1977 [CH] Switzerland .......................... 9576/77

[51] Int. Cl.³ .......................... B05D 3/02; B05D 7/02; B29C 25/00; B32B 31/26
[52] U.S. Cl. ...................................... 156/83; 264/343; 427/171; 427/384; 427/393.5; 427/400; 427/421; 427/430.1; 427/443; 427/445
[58] Field of Search .......................... 264/343, 232; 156/110 R, 83; 260/33.6 AQ; 427/307, 444, 400, 171, 336, 445, 384, 393.5, 421, 430.1, 443

[56] References Cited

U.S. PATENT DOCUMENTS

| 708,823 | 9/1902 | Minder | 427/336 |
|---|---|---|---|
| 2,170,919 | 8/1939 | Thener | 264/343 X |
| 2,393,871 | 1/1946 | Reeves, Jr. et al. | 264/343 X |
| 3,442,689 | 5/1969 | Nelson et al. | 264/343 |
| 3,968,198 | 7/1976 | Honda et al. | 264/343 |

OTHER PUBLICATIONS

Rubber Chemistry and Technology, vol. 28, No. 1, Jan.-Mar. 1955, pp. 253-255.
Rubber Chemistry and Technology, vol. 40, No. 2, Mar. 1967, pp. 371-373, 383.
Rubber Chemistry and Technology, vol. 46, No. 3, Jul. 30, 1973, p. 756.
Rubber Chemistry and Technology, vol. 47, No. 1, Mar. 1974, p. 64.

*Primary Examiner*—Evan K. Lawrence
*Attorney, Agent, or Firm*—Werner W. Kleeman

[57] ABSTRACT

A method of increasing the wear resistance of a vulcanized elastomeric body having a surface region exposed to load, for instance a tire, cone or V-belt, conveyor belt, hose, resilient element, floor covering or the like, by changing its tensile stress state, wherein the elastomeric body is at least partially treated, including the surface region exposed to load, with a swelling agent constituting a medium which is soluble in the elastomer.

25 Claims, 7 Drawing Figures

METHOD OF INCREASING THE WEAR RESISTANCE OF AN ELASTOMERIC BODY

BACKGROUND OF THE INVENTION

The present invention relates to a new and improved method of increasing the wear or abrasion resistance of a vulcanized elastomeric body, typically for instance a tire, cone or V-belt, conveyor belt, resilient element, hose, floor covering or the like, by changing its state of stress.

A prior art method for increasing the wear resistance of rubber tires contemplates separately fabricating the tread and the casing or carcass which are then vulcanized. The diameter of the tread ring is somewhat larger than that of the carcass. By exerting a large pressure upon the entire tread ring there is obtained an intimate bond with the tire carcass. As a result, there is produced a compaction and appreciable compressive stresses in the tread ring which lead to a considerable improvement in the wear resistance of the tire tread.

OBJECTS OF THE INVENTION

It is a primary object of the present invention to provide a new and improved method of increasing the wear resistance of an elastomeric body in a more rational manner than heretofore possible with prior art techniques, especially as concerns the quality of the fabricated product, and wherein also other elastomeric products which experience increased wear have imparted thereto the same beneficial effect.

Still a further notable object of the present invention aims at a new and improved method of increasing the wear or abrasion resistance of a vulcanized elastomeric body in an extremely, simple, rational and economical manner.

SUMMARY OF THE INVENTION

Now in order to implement these and still further objects of the invention, which will become more readily apparent as the description proceeds, the method aspects of the present invention are manifested by the features that the elastomeric body is at least partially treated with a swelling agent which constitutes a medium which is soluble in the elastomer.

The present invention discloses a method of increasing the wear resistance of a vulcanized elastomeric body having a surface region exposed to load, for instance a tire, cone or V-belt, conveyor belt, hose, resilient element, floor covering or the like, by changing its tensile stress state, wherein the elastomeric body is, including with only on treated, including the surface region exposed to load, with a swelling agent as aforesaid.

The resultant effect is such that the molecules of the swelling agent arranged in the polymer structure of the cross-linked elastomer increase the distance between neighboring cross-linked positions in comparison to the distance formed by the cross-linking reaction, thereby stretching the polymer chain.

It has been found that elastomeric bodies which possess the features of the invention exhibit a greater recovery or rebound elasticity and have an improved flexibility at low temperatures, in other words a so-called cold flexibility, than elastomeric bodies wherein there is likewise contained a swelling agent which, however, has been incorporated prior to vulcanization so that in contrast to the structure of the polymer chain brought about by the cross-linked state there is not accomplished any stretching, i.e, increased spacing of the cross-linked positions or locations. This property improvement will be further clarified on the basis of the following Table 1 for a natural rubber mixture.

By referring to Table 1 it will be seen that the indicated physical properties of the mixture C are better than for the mixture B, although the composition of both mixtures is the same. Strength, modulus of elasticity, rebound elasticity and hardness are higher, the wear and the flexometer test give lower values. Analogous tests have also been carried out with other types of elastomers and have been found to consistently show the same tendency.

With dynamic loads this higher rebound elasticity causes a lower hysteresis, and thus, a lower heating of the elastomeric body. This fact can be gainfully exploited for the most different types of elastomeric bodies, for instance in the case of aerial cableway rolls, hoses, hand rails for escalators and the like. It is throught to be possible to at least partially explain this effect in terms of the fact that due to the prevailing increasingly stretched structure there can be accomplished a more easy rotation about the C—C single bond, i.e., that the activation energy needed to overcome the potential difference is smaller.

TABLE 1

| | (all measurements at room temperature) | | |
|---|---|---|---|
| Mixture | Without swelling agent | B swelling agent admix** prior to vulcanization (10% by weight) | C swelling agent steeped-in*** after vulcanization (10% by weight) |
| Strength (kp/cm$^2$) (DIN 53 504 (German Industrial Standard from 8/75) | 209 | 163 | 194 |
| Modulus of elasticity 150 (kp/cm$^2$) DIN 53 504 (from 8/75) | 33 | 21 | 27 |
| Wear resistance mm hu 3 (DIN 53516 from 1/77) | 65 | 114 | 72 |
| Rebound elasticity (%) (DIN 53 512 from 6/76) | 38 | 42 | 48 |
| Flexometer text / T°C. (DIN 53 533 from 8/75) | 43 | 116 | 69 |
| Hardness (Sh A) (DIN 53 505 from 8/73) | 64 | 55 | 56 |

*Pure natural rubber quality; Vulcanizate at 160° C./15 minutes; test body size corresponding to DIN-Normal standards
**Swelling agent = Dioctyladipate + 1.5% aging protective agent + 1.5% wax swelling agent content 10% by weight
***Steeping-in conditions 80° C.

Since, however the nature and manner of the spatial arrangement of the polymer chain is basically fixed by the cross-linking and approximately corresponds to an equilibrium state during the fabrication conditions, the polymer chains which have been stretched under the action of the swelling agent have the tendency to again assume their original coiled position. This tendency is compensated by the swelling agent which has penetrated between two cross-linked positions or locations, so that with isotropic swelling there does not occur any stress towards the outside.

A uniform cross-linking of all of the surface portions also can be realized with an elastomeric body which has been molded or otherwise formed in a complicated fashion if the treatment is accomplished by immersion, and, if desired, only certain portions of the elastomeric body are imbued. For instance, only a certain part of an elastomeric body can be immersed, whereas the remaining part thus remains essentially free of any swelling agent. However, it is also possible to carry out treatment with the swelling agent by spraying, coating, rolling or like techniques.

In order to realize as uniform as possible distribution of the swelling agent at the desired part of the elastomeric body it is possible to follow the treatment of the elastomeric body with the swelling agent by a storage period, if desired, at elevated temperatures. This constitutes so-to-speak a tempering operation which also can be carried out at room temperature if the viscosity of the employed swelling agent and the nature of the elastomer so permits.

In special situations the above measures, previously discussed as being disadvantageous as concerns the process aspects, of augmenting a swelling agent constituent in a mixture also can be advantageous and specifically, under those circumstances when, with the same solubility, but different diffusion velocity there occurs a reduction or depletion of one of the constituents of the swelling agent. It is then advantageous if the composition of the swelling agent is regularly controlled, and, if necessary, to again add the reduced or depleted constituents of the swelling agent.

In order to fabricate a tire according to the invention, it is advantageous if the treatment with the swelling agent is carried out approximately for 1 to about 10 hours, preferably between about 4 to about 7 hours, at a temperature in the order of about 50° C. to about 100° C., preferably at about 70° C. to 90° C. These conditions are particularly applicable for swelling agents selected from diester aliphatic and aromatic dicarboxylic acids, trialkyl phosphate and triaryl phosphate, diaryl ether, as well as mineral oils and spindel oil. Depending upon the elastomer, in particular there are preferably employed dioctyladipate, dioctylsebacate, dioctylphthalate, tricresyl phosphate and spindel oil. As above-mentioned, tempering can follow the treatment with the swelling agent. The swelling time and tempering time can be maintained brief in that the treatment with the swelling agent can be accomplished in a suitable tempered device.

A recurring problem during the dynamic loading of elastomeric bodies, such as, for instance, cone or V-belts, tires aerial cableway rollers or the like, is the growth which these articles experience during the course of their use. The growth, among other things, is caused by virtue of the fact that the fabrication of such articles is not accomplished in an equilibrium state of the reinforcement inserts, which equilibrium state would be optimum as concerns article use. It has been found that, due to the measures contemplated by the present invention, there is provided in such case a particularly good, at least partial aid for counteracting such adverse effects, if the treatment of the elastomeric body is carried out in the stressed condition or state which the article experiences during use. In other words: a tire, by way of example, during the inventive treatment with the swelling agent should be pressurized at the internal pressure which prevails when it is used, a V-belt should be treated while experiencing the normal stress which prevails when it is used, and so forth. Hence, during such time as the article or product is treated with the swelling agent there already is experienced the growth which arises during the course of use of such article, so that, at least in part, this negative effect is counteracted, and thus, already taken into account. Taking into account this negative effect is to be accomplished to such a degree that the cross-linked elastomeric body should be fabricated appropriately smaller in size in order to already take into account, for the final dimensions of the elastomeric body, the growth which arises during swelling.

Frequently considerable requirements are placed upon the wear or abrasion resistance of floor coverings, container liners or the like. Therefore, it was obvious to expand the field of use of the inventive method also to such type elastomeric bodies. A correspondingly particularly advantageous embodiment of the invention contemplates for a floor covering, a container lining or the like, that the swelling agent, after the steeping or soaking, is caused to inherently polymerize with itself and/or with an elastomeric or other mixture constituent. As already mentioned above, owing to the polymerization of the swelling agent there is obtained a fixation of the pre-stress effect which is caused by the swelling. In the case of coverings which are not fixedly bonded to the floor or other substrate, it is advantageous to apply the teachings of the inventive method to both sides of such covering in order to avoid any warping of the covering strata or layer.

A particular effect then arises if there are connected at or in the elastomeric body reinforcement elements, for instance wires, textile or synthetic threads, sheet metal or other metallic reinforcement plates, plastic foils, rigid components or the like, in which the employed swelling agent is essentially insoluble. With such arrangement the introduced swelling agent only can cause an anisotropic elongation or expansion of the elastomer.

Owing to their isotropy, elastomers however have the tendency to uniformly elongate in all directions, so that compressive stresses are formed in the elastomer when this is not possible. Consequently, there are improved a whole spate of physical properties in contrast to such elastomeric bodies in which there is admixed the swelling agent.

In addition to the advantage as concerns the buildup of compressive stresses in the elastomeric body there is, however, still present a further advantage, namely that the compressive stresses in the elastomer act as tensile stresses upon the reinforcement elements. As a result the longevity of such type elastomeric body is appreciably increased, since filaments such as wires, textile or plastic threads or the like can be appreciably better worked at the region of the tensile load, whereas, if there is exerted pressure thereat, compression or upsetting can arise which can lead to rupture, and thus, to a loss of the functional reliability. These effects are especially of importance in the case of tires and cone or V-belts where the reinforcement elements, during the course of the rapidly occurring alternating loads, are particularly compressively loaded.

The same effect, as such occurs when there are provided reinforcement elements in the elastomeric body, also then can arise if the elastomeric body only contains swelling agent at its surface region. In this region or zone there are then formed compressive or pressure stresses, since obviously the part of the elastomeric body located therebelow is not swelled. Such type elastomeric body also can consist of, for instance, an elastomeric core and an elastomeric skin of different material compositions, so that due to the selection of a certain swelling agent, which is only soluble in the skin of the elastomeric body, there can be particularly markedly realized the desired inhomogenity of the swelling agent distribution.

If there is employed an elastomer which is selected from the group composed of natural rubber, butadiene rubber, styrene-butadiene rubber, then it is advantageous if there is used a swelling agent selected from the group comprising: diester alphatic dicarboxylic acids, trialkyl phosphate, diaryl ether, ether thioether or a mineral oil or a mixture thereof. When using elastomers such as chloroprene or acrylonitrile butadiene rubber there are equally usable the previously mentioned swelling agents with the exception of mineral oil. Furthermore, in such case there also can be employed triaryl phosphate, diester aromatic dicarboxylic acids or alkyl-sulfonic acid ester or a mixture thereof.

The swelling agent can also comprise a polymerizable substance which is soluble in the elastomer to be treated.

Since the incorporation of the swelling agent molecules in the cross-linked elastomeric body or elastomer constitutes a diffusion process, the viscosity of the swelling agent of course plays an extensive role as to the timewise course of the process. It is advantageous if the kinematic viscosity of the swelling agent at 20° C. is below about 100 cSt. Such viscosities, even in the case of relatively large elastomeric bodies into which there should be diffused an appreciable amount of the swelling agent, still render possible an economically acceptable swelling time, which at most amounts to several hours. In this connection there should also be mentioned that of course the vapor pressure of the swelling point is of importance. If such is relatively high, then, depending on the working temperature, there exists the danger that the swelling agent, during processing, again will diffuse out and vaporize. The correct selection of a suitable swelling agent therefore must be separately considered from case to case.

In order to prevent that certain additives which are present in the elastomeric body will be dissolved out due to the effect of the swelling agent and, thus, on the one hand, no longer can be effective in the elastomeric body, and, on the other hand, after the contemplated swelling agent composition, it is of advantage if there is admixed to the swelling agent additives or adjuvants, for instance aging resistant or aging protective agents, waxes or the like. The selection of these additives depends upon the composition of the elastomeric body. The above-discussed additives, aging protective agents and waxes are characteristic additives of rubber mixtures. Suitable aging protective agents are, by way of example, p-phenylene diamine or condensation products of acetone and diphenylamine. Frequently employed substances are N-isopropyl-N'-phenyl-p-phenylene diamine and phenyl-$\beta$-naphthylamine. The employed waxes are aliphatic hydrocarbons which are primarily straight chain, and encompass a range of about $C_{14}$ to $C_{60}$. The maximum of the molecular weight distribution is in the order of about $C_{30}$.

If it is desired to achieve special effects, then it is of advantage to use as the swelling agent a mixture of two or more liquids which swell approximately with the same rapidity in the elastomer. Hence, in this way, if desired, there can be obtained at different layers of the vulcanizate a different type of swelling, so that it is possible to advantageously influence the strived for structural properties. The in toto equally rapid swelling of the employed components then is of significance if the same swelling agent bath should be employed for the preparation of a number of elastomeric bodies, since otherwise steps must be taken to ensure that the composition of the swelling agent is continuously controlled and to possibly replenish components thereof. Also, there exists, on the other hand, the danger that a swelling agent constitutent which has been incorporated into the elastomeric body at a later stage in the processing, due to de-mixing, again diffuses out, and thus the properties of the elastomeric body experience a change during the course of their use.

Of particular importance is the use of the present invention for rubber articles in the form of tires. In this case it is advantageous if the elastomeric body only is treated with a quantity of swelling agent as is needed for swelling the regions of said elastomeric body which are near the surface. There then arises the previously discussed progressive pre-stress effect. Such type tires thus possess outstanding wear resistance behavior, which, in contrast to conventional tires, can be improved by up to 50% and more. The improved wear or abrasion resistance characteristic is derived by virtue of the fact that there is appreciably improved the tear propagation strength as concerns cuts and damage appearing at the tread in comparison to tires which are fabricated by techniques differing from the present invention. This can be demonstrated by the fact that a cut which is formed at the tread does not spread apart, rather remains essentially closed or, in fact, the flanks or edges of the cut are pressed together. Since the tear propagation strength constitutes one of the governing properties for the wear resistance, it is possible to considerably improve tire wear by practising the present invention.

In this regard there is referred to a further important attendant feature of the present invention. In the case of an article, such as a tire, a cone or V-belt or a conveyor belt, where possibly there are used crossed reinforcement inserts formed of parallel filaments or threads or the like, during the course of the use of the article there arises a displacement phenomenon of the reinforcement elements which brings the article closer to its equilibrium state. For instance, there can arise a change in the angle of the fabric plies of the tires, so that the circumference of the tire increases by a few percent. The same effect occurs, as is known, also in the case of cone or V-belts. As already discussed above in conjunction with the increased rebound elasticity of elastomeric bodies which have been fabricated according to the teachings of the present invention, there is present an increased mobility of the polymer chain. At the same time, however, tensile stresses are effective from the swollen elastomeric body upon the reinforcement elements or inserts thereof, which thus bring about a favorable positional change of the reinforcement elements which contributes to relaxation thereof. This effect particularly then arises if, as will be explained more fully hereinafter, the action of the swelling agent upon the elastomeric body is accomplished in a condition corresponding to its load condition during use.

The invention is then particularly advantageous if the tire has a tread profile possessing profile protuberances which are continuous over the periphery or circumference thereof. These profile protuberances can be design or pattern rings extending without interruption over the entire tire circumference. With such type pattern structure there cannot arise any appreciable increase in the volume due to the incorporation of the swelling agent in the peripheral direction, so that there can be realized a maximum pressure or compressive pre-stress in this direction. This effect would not be present to the same degree for a tread pattern formed of individual profile blocks, because then each profile block could shift or deviate into an adjacently situated profile groove while increasing the volume, so that the important compressive pre-stress effect, which is brought about by the coaction of the non-expansible reinforcement elements or inserts in conjunction with the swellable rubber, would not be fully realized. There are, however, also fields of applications for tires where there is present a particular loading of sectional or profile protuberances which extend approximately in the axial direction. In this case by utilizing the teachings of the present invention it is possible to equally appreciably reduce the wear of such type profile protuberances.

The inventive method for fabricating an elastomeric body contemplates that the finished cross-linked elastomeric body, for instance the finish vulcanized rubber body, if desired, while heating, is treated with the swelling agent. Due to the solubility of the swelling agent in the elastomer such penetrates between the polymer chains and thereby increases the spacing or distance of the cross-linked places or locations.

BRIEF DESCRIPTION OF THE DRAWINGS

The invention will be still better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
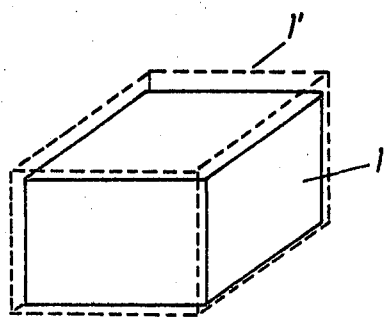
FIG. 1 schematically illustrates an elastomeric body without any reinforcement inserts or elements.

Describing now the drawings, in FIG. 1 there is shown a cube or block of an elastomeric body 1 in its unswollen condition in full lines and in its swollen condition as indicated by reference character 1' and shown in phantom lines. A nonreinforced elastomeric body grows isotropically and uniformly in all directions after incorporation of the swelling agent. Contrary to widely accepted views the properties of the swollen elastomeric body are not necessarily poorer in all respects than those of the unswollen elastomeric body. Quite to the contrary, it has in fact been surprisingly found that the rebound elasticity and the cold flexibility can be increased by the incorporation of the swelling agent.

Figure 2:
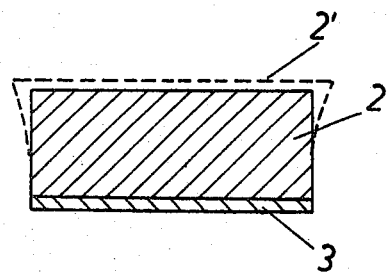
FIGS. 2 and 3 respectively schematically illustrate elastomeric bodies containing reinforcement inserts or elements.
Figure 3:
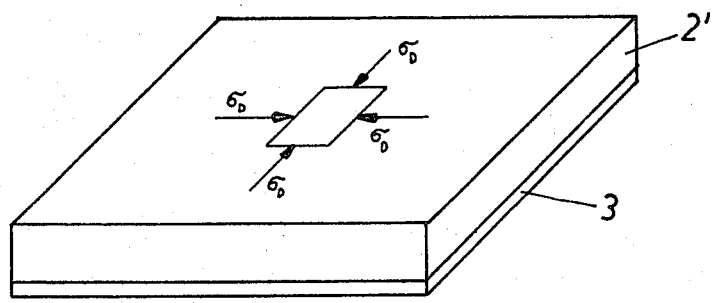

Now in FIG. 2 there is illustrated an elastomeric body 2 having a reinforcement plate 3, for instance formed of sheet metal, both in the unswollen condition as shown in full lines and in the swollen condition as indicated by reference character 2' and shown in phantom lines. Due to the swelling of the swelling agent there is produced an increase in the volume of the elastomeric body, and in accordance with the quantity of incorporated swelling agent there is obtained the shape or contour shown with phantom lines. At the center of such type elastomeric body there is not possible an isotropic swelling, rather only an elevational growth since the elastomeric body 2 is fixedly bonded with the non-swellable reinforcement plate or element 3. FIG. 3 shows in perspective view the elastomeric body in the swollen condition 2', and there is superficially shown an approximately quadratic surface element. Acting upon this surface element from all sides are compressive stresses $\delta D$ of the same magnitude. From other areas of technology there are known several fields of application for increasing the compressive stresses in a layer of a composite body. An example of such is the enamel layer which is applied to a metal plate. Due to the contraction of the hot metal plate during cooling the enamel layer is exposed to compressive stresses, which is of significant importance for the use of such type articles, since the ability to load enamel with tensile forces is of course not particularly great. In analogous manner there also can be interpreted the hardening process occurring by nitriding steel. Nitrogen diffuses into the surface of the heated steel body, and in this diffusion zone there occurs a spreading or widening of the lattice or grid. Consequently, there can build-up compressive stresses in the nitrided layer and there can be formed tensile stresses in the layers located below the nitrided layer.

Figure 4:
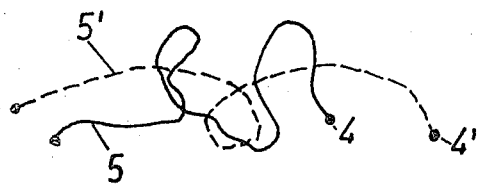
FIG. 4 schematically illustrates a polymer chain section.

Continuing, in FIG. 4 there is illustrated a section or a polymer network or structure. In the unswollen state the polymer chain 5 is markedly coiled between the cross-linked locations 4. In contrast thereto the cross-linked locations 4' after swelling, spread apart while stretching the polymer chain 5'.

Figure 5:
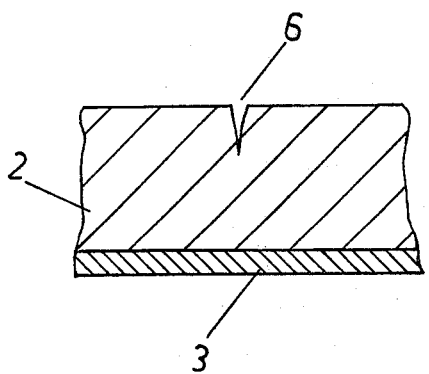
FIGS. 5 and 5a respectively illustrate a section of an elastomeric body having a cut and equipped with reinforcement elements.
Figure 5A:
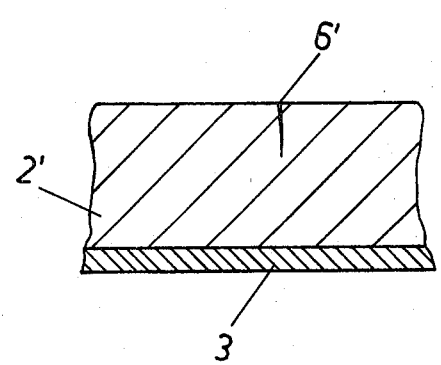

The build-up of compressive stresses in an elastomeric body which is connected with a reinforcement plate 3 or equivalent structure, can be demonstrated by applying a cut-out or cut 6'. While prior to swelling a cut 6 in an elastomeric body 2 (FIG. 5) tends to spread apart, after the swelling the flanks or edges of a cut 6' are pushed or compressed together in the elastomeric body 2' (FIG. 5a). At the very least, with a small quantity of swelling agent there does not arise any spreading apart of the cut 6'.

Figure 6:
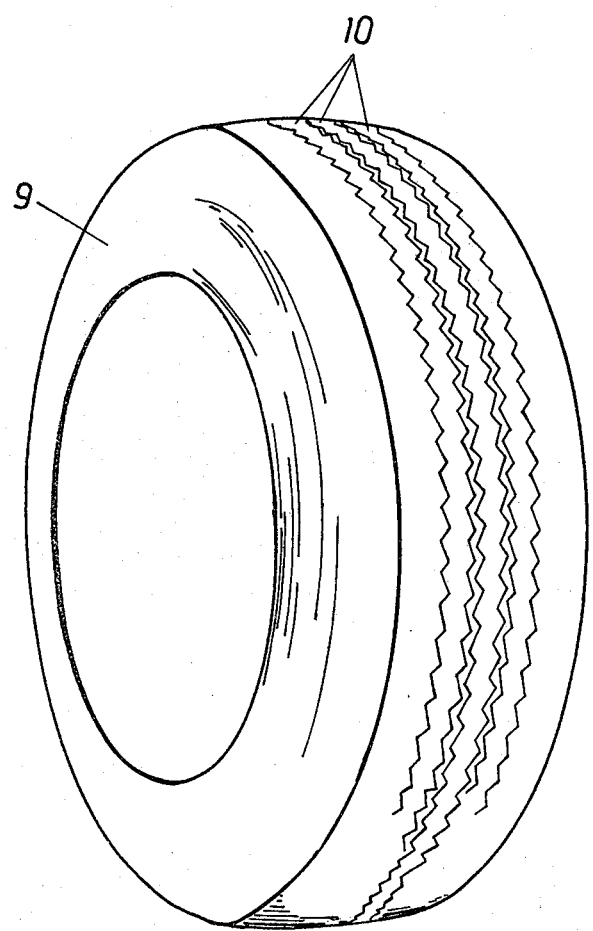
FIG. 6 illustrates an advantageous construction of tire profile according to the present invention.

Finally, in FIG. 6 there is illustrated a tire 9 which has a design or pattern ring 10 which is continuous over the circumference thereof. Such type tread profile is particularly suitable for use with the method of the present invention, since by virtue of the closed circumferential profile in the peripheral direction there can be formed or built-up particularly great compressive stresses.

While there are shown and described present preferred embodiments of the invention, it is to be distinctly understood that the invention is not limited thereto, but may be otherwise variously embodied and practiced within the scope of the following claims.

Accordingly what I claim is:

1. A method of increasing the wear resistance of a vulcanized elastomeric body having a surface region exposed to load containing at least one reinforcement element, for instance, a tire, V-belt, conveyor belt, hose, resilient element, floor covering or the like, by changing its stress state, comprising the steps of:
providing an elastomeric body with at least one reinforcement element;
treating only the surface region exposed to load of the elastomeric body by impregnating said elastomeric body with a swelling agent comprising a medium which is soluble in the elastomer of the elastomeric body in an amount effective for swelling said treated portion,
the distribution of the swelling agent diminishing from the region of said treated region of the elastomeric body towards the reinforcement element.

2. The method as defined in claim 1, including the step of:
treating the elastomeric body with the swelling agent under the action of heat.

3. The method as defined in claim 1, including the step of:
treating the elastomeric body by immersion of the elastomeric body in said swelling agent.

4. The method as defined in claim 1, including the step of:
treating the elastomeric body by spraying-on the swelling agent.

5. The method as defined in claim 1, including the step of:
treating the elastomeric body by coating the swelling agent thereat.

6. The method as defined in claim 1, including the step of:
treating the elastomeric body by rolling the swelling agent thereon.

7. The method as defined in claim 1, further including the step of:
storing the elastomeric body for a predetermined period of time following the treatment with the swelling agent.

8. The method as defined in claim 7, wherein
the storing step is carried out at an elevated temperature.

9. The method as defined in claim 1, further including the step of:
bonding at least one reinforcement element with the elastomeric body prior to said treating step and with which reinforcement element the employed swelling agent does not exhibit any appreciable solubility.

10. The method as defined in claim 9, wherein wires are used as the reinforcement element.

11. The method as defined in claim 9, wherein textile threads are used as the reinforcement element.

12. The method as defined in claim 9, wherein plastic threads are used as the reinforcement element.

13. The method as defined in claim 9, wherein sheet metal is used as the reinforcement element.

14. The method as defined in claim 9, wherein a plastic foil is used as the reinforcement element.

15. The method as defined in claim 9, wherein a rigid element is used as the reinforcement element.

16. The method as defined in claim 1, including the step of:
using as the swelling agent a compound selected from the group consisting of diester aliphatic dicarboxylic acids, trialkyl phosphate, diaryl ether, ether thioether, mineral oil or a mixture thereof with an elastomer selected from the group consisting of natural rubber, butadiene rubber and styrene-butadiene rubber.

17. The method as defined in claim 1, including the step of:
using as the swelling agent a compound selected from the group consisting of triaryl phosphate, alkylsulfonic acid ester, diester aromatic dicarboxylic acid or a mixture thereof with an elastomer selected from the group consisting of chloroprene and acrylonitrile butadiene rubber.

18. The method as defined in claim 17, further including the step of admixing to the swelling agent an additive,
said additive being selected from the group consisting of an aging protective agent, wax or mixtures thereof.

19. The method as defined in claim 1, including the step of:
using as the swelling agent a mixture of at least two liquids which swell essentially with the same rapidity in the elastomer of the elastomeric body.

20. The method as defined in claim 1, especially for altering the stress state of a tire, comprising the step of:
carrying out the treatment with the swelling agent by immersion for a duration of approximately 1 to 10 hours and at a temperature of approximately 50° C. to about 100° C.

21. The method as defined in claim 20, wherein said treatment is carried out between approximately 4 to 7 hours at a temperature between about 70° C. to 90° C.

22. The method as defined in claim 1, including the step of:
carrying out the treatment of the elastomeric body in a stress condition essentially corresponding to that prevailing during use of the elastomeric body.

23. The method as defined in claim 1, wherein the region of the elastomeric body situated opposite the treated part is essentially free of swelling agent.

24. A method of increasing the wear resistance of a vulcanized elastomeric body having a surface region exposed to load, for instance a tire, V-belt, conveyor belt, hose, resilient element, floor covering or the like by changing its stress state, comprising the steps of:
providing an elastomeric body;
treating only the surface region exposed to load of the elastomeric body by impregnating said elastomeric body with a polymerizable swelling agent comprising a medium which is soluble in the elastomer of the elastomeric body in an amount effective for swelling said treated portion;
swelling only part of the elastomeric body with the swelling agent; and
following the swelling step polymerizing the swelling agent.

25. A method of increasing the wear resistance of a vulcanized elastomeric body having a surface region exposed to load, for instance a tire, V-belt, conveyor belt, hose, resilient element, floor covering or the like by changing its stress state, comprising the steps of:
providing an elastomeric body;

treating only the surface region exposed to load of the elastomeric body by impregnating said elastomeric body with a polymerizable swelling agent comprising a medium which is soluble in the elastomer of the elastomeric body in an amount effective for swelling said treated portion; swelling only part of the elastomeric body with the swelling agent; and following the swelling step polymerizing the swelling agent with itself, an elastomeric constituent, or another constituent.

* * * * *